United States Patent [19]

Kim

[11] Patent Number: 6,027,029
[45] Date of Patent: Feb. 22, 2000

[54] SMART CARD CAPABLE OF ADJUSTING VOLTAGES SUPPLIED FROM EXTERNAL DEVICE

[75] Inventor: Kwan-Sung Kim, Yongin, Rep. of Korea

[73] Assignee: Samsung Electronics Co., Ltd, Rep. of Korea

[21] Appl. No.: 09/063,920

[22] Filed: Apr. 21, 1998

[30] Foreign Application Priority Data

Apr. 21, 1997 [KR] Rep. of Korea ....................... 97/14743

[51] Int. Cl.$^7$ .................................................. G06K 19/06
[52] U.S. Cl. ............................................................ 235/492
[58] Field of Search .................................. 235/492, 486, 235/441, 380, FOR 375

[56] References Cited

U.S. PATENT DOCUMENTS

| 4,924,171 | 5/1990 | Baba et al. ........................... 323/347 |
| 5,128,523 | 7/1992 | Diehl et al. ............................ 235/441 |
| 5,804,811 | 9/1998 | Saitoh et al. .......................... 235/492 |

*Primary Examiner*—Thien M. Le
*Assistant Examiner*—Daniel H. Sherr
*Attorney, Agent, or Firm*—Dilworth & Barrese

[57] ABSTRACT

A smart card capable of adjusting voltages supplied from an external device. In the smart card, a voltage detector detects levels of the voltages supplied from the external device and generates enable signals, if the detected levels are lower than a predetermined level. A voltage controller converts levels of the voltages supplied from the external device into levels of operating voltages of the smart card, in response to the enable signals. A logic level converter converts logic levels of signals received from the external device into logic levels of the smart card, based on a voltage difference between the voltages from the external device and the converted operating voltages.

7 Claims, 3 Drawing Sheets

SMART CARD CAPABLE OF ADJUSTING VOLTAGES SUPPLIED FROM EXTERNAL DEVICE

BACKGROUND OF THE INVENTION

1. Field of the Invention

The present invention relates to an IC (Integrated Circuit) card, and in particular, to a smart card capable of adjusting voltages supplied from an external device.

2. Description of the Related Art

An IC card being a data storage device in the form of a card is commonly used for a card terminal such as a cash dispenser or an ID (Identification) system. Further, in a GSM (Global Systems for Mobile Communication) cellular phone, the IC card is used for storing personal information and system information. Such a card terminal includes a card reader.

The IC card can be divided into a memory card and a smart card. Having only a memory for storing service information, the memory card cannot communicate with the card terminal. That is, the card terminal reads the service information written in the memory unilaterally. However, having a central processing unit (CPU) in addition to the memory, the smart card can write the service information in the memory, and change and delete the service information written in the memory. Of course, in order to access to the memory, the CPU is provided with various control signals from the card terminal. Besides, the smart card includes an input/output (I/O) unit through which it interchanges serial data with the card reader according to a protocol specified by ISO Standard 7816/1~3 or GSM Standard 11.11, which specifies the mechanical and electric standards for the IC card.

Referring to FIG. 1, a conventional smart card is composed of a CPU 14, an I/O unit 15, and a memory 16. The memory 16 includes a RAM (Random Access Memory) for temporarily storing information, and a non-volatile memory such as a flash ROM, a mask ROM and an EEPROM (Electrically Erasable and Programmable ROM) for permanently storing the service information. In view of the uses, the memory 16 can be divided into a program memory for storing a program for controlling an overall operation of the smart card and a data memory for storing various service information. When not used, the smart card is normally separated from the card terminal. Thus, the smart card uses the non-volatile memory to retain the service information even when it is not provided with the supply voltage from the card terminal. As is well known, the non-volatile memory can retain the information stored therein even if the supply voltage is cut off. Further, the non-volatile memory can erase unnecessary information therefrom, and read/write the service information from and into it. The CPU 14 asynchronously interchanges the serial data with the card terminal via the I/O unit 15.

In this fashion, the CPU 14 reads the service information from the memory 16 to transfer the read information to the card terminal (i.e., the card reader) via the I/O unit 15, and writes the service information received from the card terminal into the memory 16. The memory 16 has various information stored therein, which is used when the CPU 14 accesses to the memory 16 or interchanges the service information with the card terminal via the I/O unit 15. In particular, the memory 16 stores all the service information concerning a card user, an issuer, and a sub-issuer.

FIG. 2 illustrates an arrangement of input/output contact terminals in a known smart card, as specified by GSM Standard 11.11 and ISO Standard 7816/1. Table 1 specifies the uses of the respective contact terminals C1–C8.

TABLE 1

| Term. | Use |
|-------|-----|
| C1 | Vcc (Supply Voltage) |
| C2 | RST (Reset Signal) |
| C3 | CLK (Clock Signal) |
| C4 | Unused |
| C5 | GND (Ground) |
| C6 | Vpp (Program Voltage) |
| C7 | I/O (Data I/O) |
| C8 | Unused |

As illustrated in FIG. 2, the smart card has a number of the contact terminals which contact the card reader of the card terminal. With reference to Table 1, the contact terminals C1, C5 and C6 are related to providing the supply voltage Vcc and the program voltage Vpp to the smart card. Further, the contact terminal C2, C3, and C7 are used in transferring a reset signal RST, the serial data SD, and a clock signal CLK, respectively. Including such contact terminals C1–C8, the smart card is provided with the supply voltage Vpp from the card reader when it contacts the card reader, and consecutively initialized in response to the reset signal RST received from the card reader. After initialization, the smart card communicates with the card reader via the I/O unit 15. Here, the program voltage Vpp is applied to the flash ROM or EEPROM to permanently write the service information therein.

As is well known, the smart card operates with a specified supply voltage Vcc provided from the card reader. However, with the development of an the IC fabricating technology, there is a tendency to reduce the supply voltage (i.e., operating voltage) of the smart card. Therefore, it might happen that the supply voltage provided from an old-fashioned card reader is not coincident with the specified supply voltage of the smart card. In this case, the smart card may be damaged by the overvoltage and overcurrent. Conventionally, in order to prevent the damage, the user should check the supply voltage of the card reader inconveniently prior to use the smart card unless the card terminal has a function of automatically converting the supply voltage level.

SUMMARY OF THE INVENTION

It is therefore an object of the present invention to provide a smart card capable of adjusting voltages supplied from an external device.

To achieve the above object, there is provided a smart card capable of adjusting voltages supplied from an external device. In the smart card, a voltage detector detects levels of the voltages supplied from the external device and generates enable signals, if the detected levels are lower than a predetermined level. A voltage controller converts levels of the voltages supplied from the external device into levels of operating voltages of the smart card, in response to the enable signals. A logic level converter converts logic levels of signals received from the external device into logic levels of the smart card, based on a voltage difference between the voltages from the external device and the converted operating voltages.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE PREFERRED EMBODIMENT

A preferred embodiment of the present invention will be described in detail hereinbelow with referent to the accompanying drawings. In the following description, numerous specific details are set forth to provide a more thorough understanding of the present invention. It will be apparent, however, to one skilled in the art that the present invention may be practiced without these specific details. In other instances, well known functions or constructions have not been described so as not to obscure the present invention.

Figure 1:
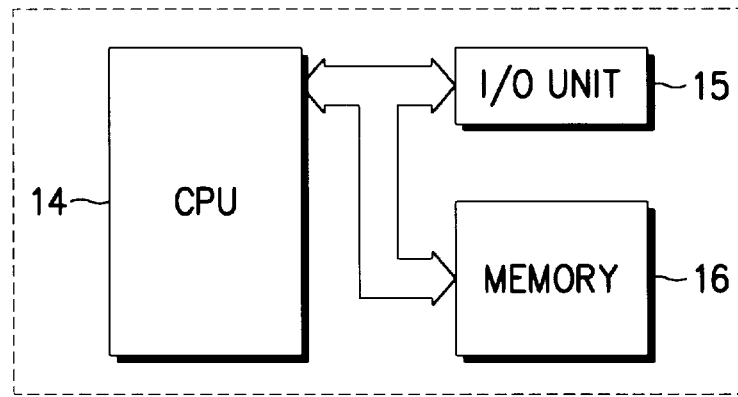
FIG. 1 is block diagram of a smart card according to the prior art.
Figure 2:
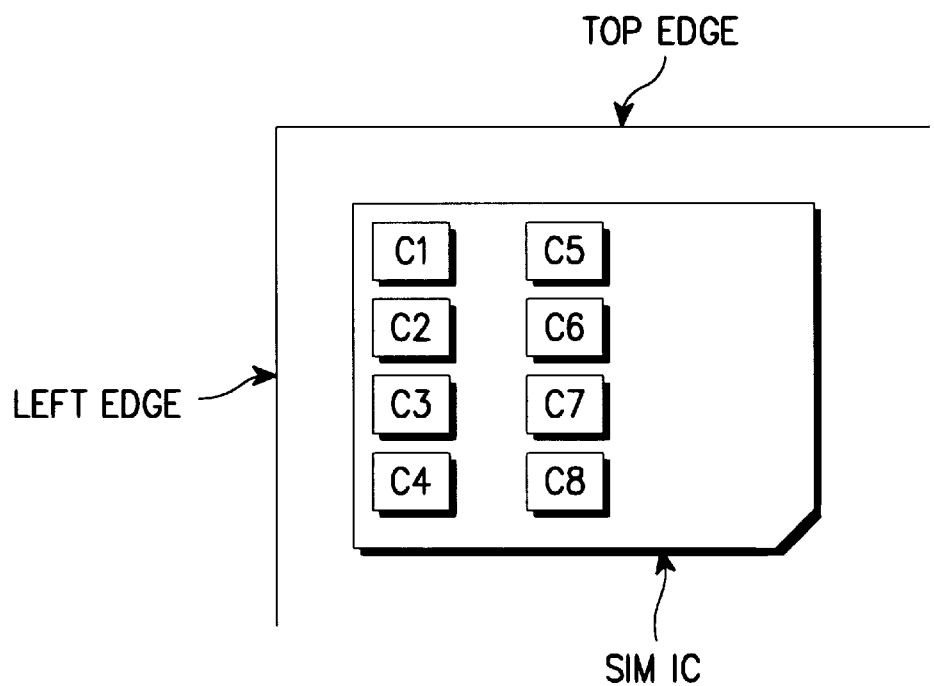
FIG. 2 is a diagram illustrating arrangement of contact terminals of a known plug-in type smart card.
Figure 3:
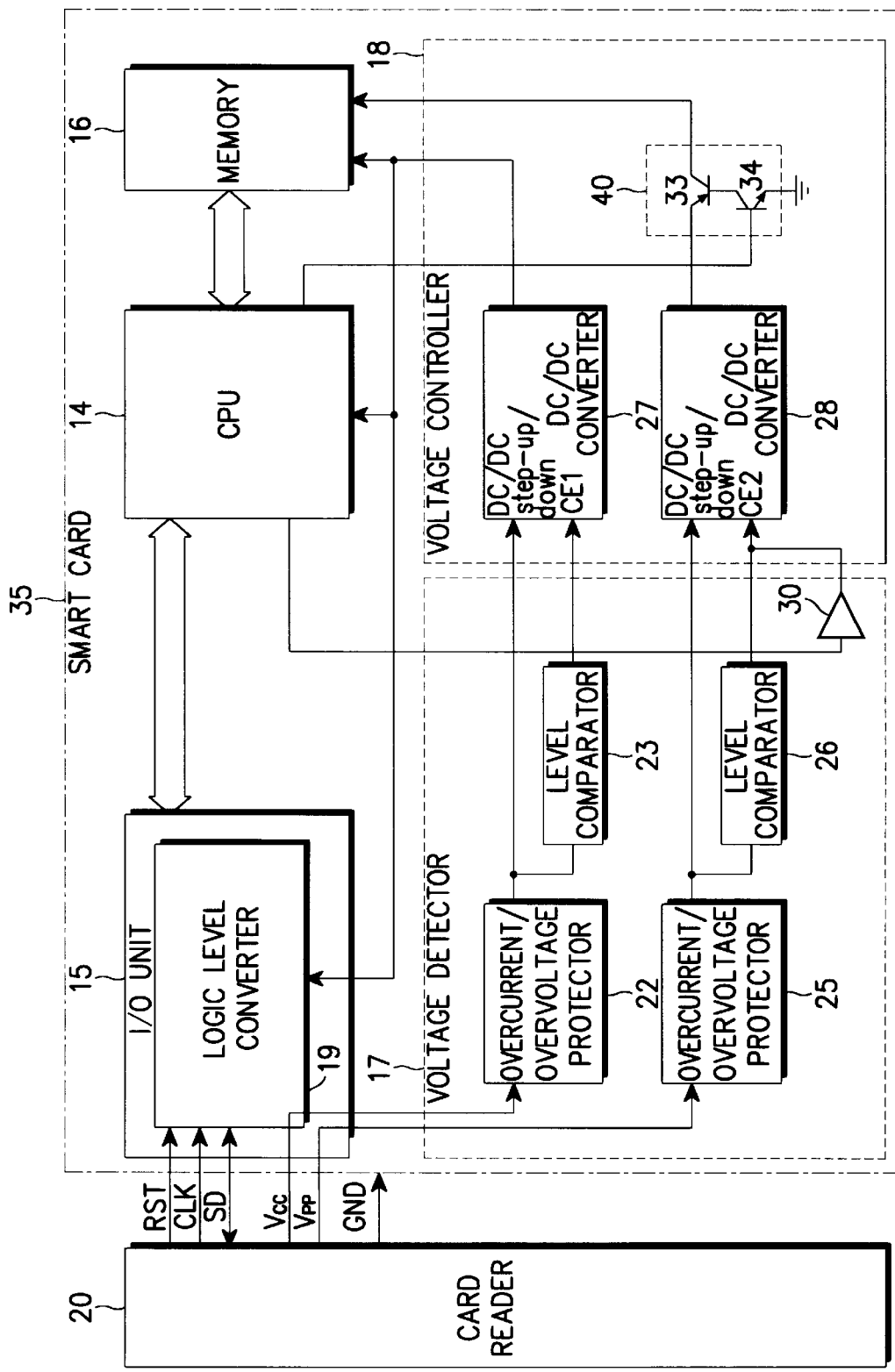
FIG. 3 is a block diagram of a smart card capable of adjusting voltages supplied from an external device according to a preferred embodiment of the present invention.

Referring to FIG. 3, a smart card 35 according to the present invention is connected to card reader 20. In the smart card 35, a memory 16 is composed of a RAM for temporarily storing information and a non-volatile memory such as a flash ROM, a mask ROM, and an EEPROM, for permanently storing the service information. The memory 16 requires a first voltage being an operating voltage, and a second voltage being a program voltage (i.e., a write voltage). An I/O unit 15 receives the supply voltage Vcc, the program voltage Vpp, the reset signal RST, and the click CLK from the card reader 20, and interfaces the serial data SD between the smart card 35 and the card reader 20. A voltage detector 17 is composed of first and second overcurrent/overvoltage protectors 22 and 25 for respectively detecting overcurrent/overvoltage of the supply voltage Vcc and the program voltage Vpp to protect the internal circuits of the smart card 35 from the overcurrent/ overvoltage. The first and second overcurrent/overvoltage protectors 22 and 25 may be made of a switching element such as a transistor or a polyswitch to protect the smart card 35 from the overcurrent/overvoltage. It is known that the polyswitch is conductive like a conducting wire when a normal current flows therethrough. However, when an overcurrent flows through the polyswitch, a resistance of the polyswitch increases abruptly, making the polyswitch nonconductive. Thereafter, if the overcurrent flowing through the smart card 35 is lowered to the normal current, the polyswitch becomes conductive again. Further, to protect the smart card 35 from the overvoltage, a diode or transistor may be used. First and second level comparators 23 and 26 compare the supply voltage Vcc and the program voltage Vpp from the overcurrent/overvoltage protectors 22 and 25 with first and second reference voltages respectively, and generate first and second chip enable signals CE1 and CE2 if the voltage differences between the reference voltages and the output voltages of the first and second overcurrent/ overvoltage protectors 22 and 25 are lower than a specified value. A voltage controller 18 is enabled in response to the first and second chip enable signals CE1 and CE2, to convert levels of the supply voltage Vcc and the program voltage Vpp into the first and second voltages for the memory 16. As illustrated, the voltage controller 18 is composed of first and second DC/DC converters 27 and 28, which can convert the variable input voltages Vcc and Vpp to the constant output voltages, within the specific range of the operating voltages. A logic level converter 19 can be included in the I/O unit 15 as illustrated in FIG. 3 or realized separately, at the option of the circuit designer. The logic level converter 19 provided with the supply voltage of which the level is adjusted by the voltage controller 18, functions as an interface circuit for converting logic levels of the reset signal RST, the clock signal CLK, and the serial data SD received from the card reader 20 based on the difference between the external supply voltage Vcc and the adjusted supply voltage. For example, a low voltage technology (LVT) proposed by Philips converts (interfaces) the signal level between two systems having difference signal levels. A CPU 14 operates with the first voltage supplied from the first DC/DC converter 27, and interchanges the data SD with the card reader 20 via the logic level converter 19 to write and read the data SD into and from the memory 16.

Specifically describing the voltage controller 18, the external supply voltage Vcc from the card reader 20 is applied to the CPU 14, the memory 16 and the logic level converter 19 via the first DC/DC converter 27. Similarly, the program voltage Vpp from the card reader 20 is applied to the memory 16 via the second DC/DC converter 28 and a switching circuit 40. Here, the supply voltage Vcc is an operating voltage for the memory 16 and the program voltage Vpp is a write voltage for the memory 16. The switching circuit 40 is composed of a transistor 33 for transferring the output voltage of the second DC/DC converter 28 to the memory 16, and a transistor 34 for turning on and off the transistor 33 in response to a switching control signal from the CPU 14. When the memory 16 is not in the write mode, the CPU 14 inactivates the switching control signal to turn off the transistor 33.

Meantime, the CPU 14 generates a third chip enable signals to second DC/DC converter 28 via a buffer 30. In case the memory 16 is not in the program mode (i.e., a write mode), the CPU 14 inactivates the third chip enable signal. Upon receiving the inactivated third chip enable signal via the buffer 30, the second DC/DC converter 28 is disabled to cut off the program voltage Vpp to the memory 16, thereby reducing the power consumption.

Figure 4:
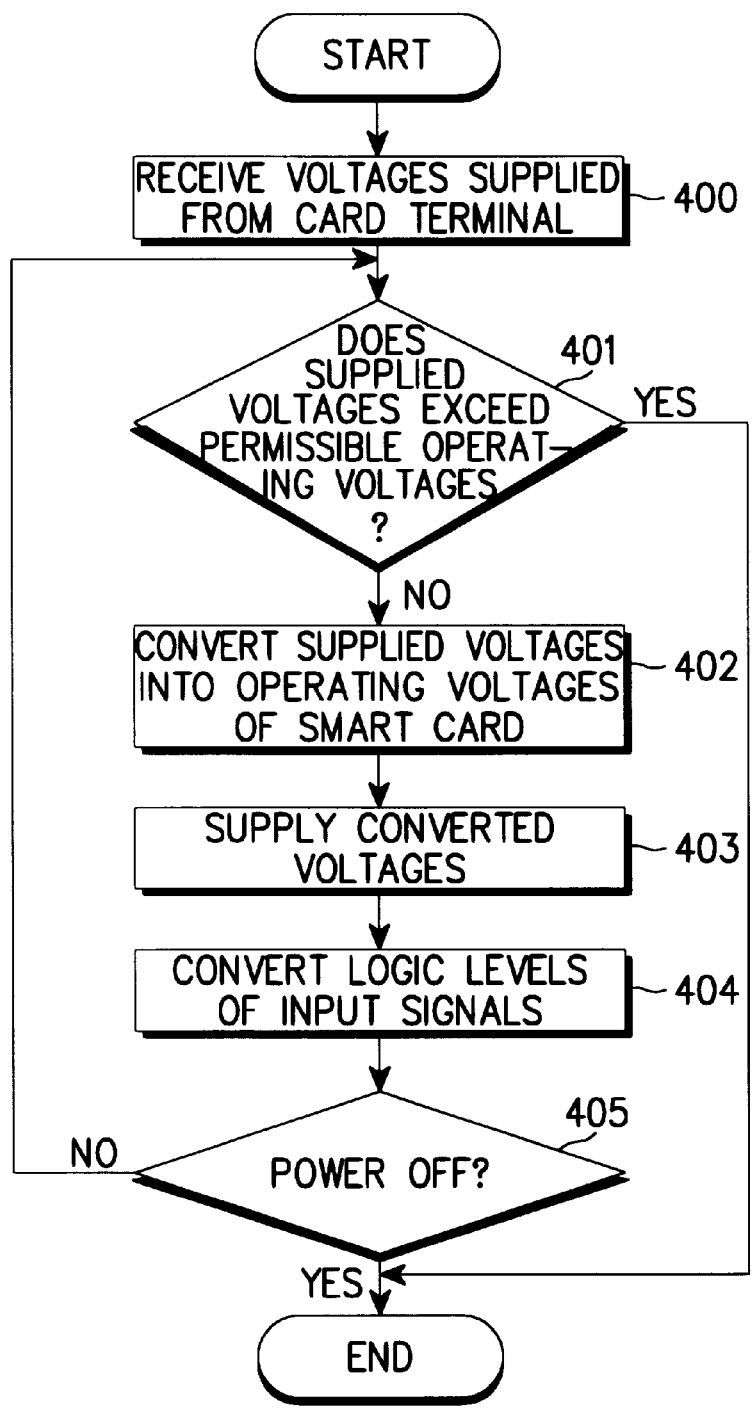
FIG. 4 is a flow chart for adjusting the external voltages supplied to the smart card of FIG. 3 according to a preferred embodiment of the present invention.

FIG. 4 is a flow chart for adjusting the voltages supplied to the smart card of FIG. 3. Referring to FIGS. 3 and 4, if the user inserts the smart card 35 into the card reader 20, the smart card 35 is provided with the supply voltage Vcc and the program voltage Vpp from the card reader 20 via the I/O unit 15, at step 400. The first and second level comparators 23 and 26 check at step 401 whether the supply voltage Vcc and the program voltage Vpp supplied from the card reader 20 are larger than the permissible operating voltages of the first and second DC/DC converters 27 and 28. If so, the first and second level comparators 23 and 26 inactivate the first and second chip enable signals CE1 and CE2. In response to the inactivated chip enable signals CE1 and CE2, the first and second DC/DC converters 27 and 28 of the voltage controller 18 are disabled to cut off the supply voltage Vcc and the program voltage Vpp being supplied to each part of the smart card 35. However, if not so, the first and second level comparators 23 and 26 of the voltage detector 17 activate at step 402 the first and second chip enable signals CE1 and CE2. Then, the first and second DC/DC converters 27 and 28 convert the supply voltage Vcc and the program voltage Vpp to the first and second voltages, in response to the activated chip enable signals CE1 and CE2. At step 403, the level adjusted supply voltage Vcc and program voltage Vpp are supplied to the CPU 14, the logic level converter 19, and the memory 16. Then, at step 404, the smart card 35 begins to operate, interchanging the service information with the card reader 20. At this moment, the level converter 19 converts the levels of the reset signal RST, the clock signal CLK, and the data SD from the card reader 20 into the signal levels of the smart card 25, based on the voltage difference between the external supply voltage Vcc and the adjusted supply voltage from first DC/DC converter 27. In the meantime, at step 405, if the user pulls out the smart card 35 from the card reader 20, cutting off the external supply voltage Vcc and the program voltage Vpp being supplied to the smart card 35, or if the CPU 14 inactivates the third chip enable signal, the procedure returns to the step 401 to repeat the foregoing steps.

As described above, the smart card of the invention can automatically adjust the levels of the external supply voltage Vcc and the program voltage Vpp. Thus, even though the smart card has the operating voltage different from that of the card terminal, it is possible to protect the smart card from the overcurrent and overvoltage.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A smart card capable of adjusting voltages supplied from an external device, comprising:

a voltage detector for detecting levels of the voltages supplied from the external device and generating enable signals, if the detected levels are lower than a predetermined level;

a voltage controller for converting levels of said voltages supplied from the external device into levels of operating voltages of the smart card, in response to said enable signals; and a logic level converter for converting logic levels of signals received from said external device into logic levels of said smart card, based on a voltage difference between the voltages from the external device and the converted operating voltages.

2. A smart card capable of adjusting voltages supplied from an external device, comprising:

a voltage detector for detecting levels of first and second voltages supplied from the external device to generate first and second enable signals;

a voltage controller for converting levels of said first and second voltages supplied from the external device into levels of first and second operating voltages for the smart card, in response to said first and second enable signals;

a memory for receiving said first operating voltage to operate and receiving said second operating voltage to write therein data input from the external device;

a central processing unit supplied with said first operation voltage, for generating a third enable signal to said voltage controller when said memory is in a program mode;

a logic level converter for converting logic levels of signals received from said external device into logic levels of said smart card, based on a voltage difference between the first voltage from the external device and the first operating voltage.

3. The smart card as claimed in claim 2, wherein said central processing unit inactivates said enable signal when the memory is in a read mode or an erase mode, whereby said voltage controller cuts off the second operating voltage during the read and erase modes of the memory.

4. The smart card as claimed in claim 2, wherein said voltage controller comprises first and second DC/DC converters which can adjust the first and second voltages into the first and second operating voltages.

5. The smart card as claimed in claim 4, wherein said voltage detector comprises first and second level comparators for comparing the detected levels of the first and second voltages with first and second reference voltages, respectively.

6. The smart card as claimed in claim 2, wherein said voltage detector comprises first and second overcurrent/overvoltage protectors for protecting said smart card from overcurrent and overvoltage input from said external device.

7. The smart card as claimed in claim 2, wherein said first and second voltages are a supply voltage and a program voltage for said memory, respectively.

* * * * *